(12) United States Patent
Killen et al.

(10) Patent No.: US 6,577,037 B2
(45) Date of Patent: Jun. 10, 2003

(54) SELF-UNLOADING MAGNETIC COUPLER

(75) Inventors: Richard Killen, Maple Valley, WA (US); Bruce D. Densmore, Seattle, WA (US); John L. Brockman, Seattle, WA (US); Karl J. Lamb, Sequim, WA (US); Toby Merrill, Port Angeles, WA (US)

(73) Assignee: MagnaDrive Corporation, Seattle, WA (US)

( * ) Notice: Subject to any disclaimer, the term of this patent is extended or adjusted under 35 U.S.C. 154(b) by 0 days.

(21) Appl. No.: 09/898,912

(22) Filed: Jul. 3, 2001

(65) Prior Publication Data

US 2003/0006661 A1 Jan. 9, 2003

(51) Int. Cl.[7] .................. H02K 16/00; H02K 49/00
(52) U.S. Cl. .................. 310/114; 310/114; 310/103
(58) Field of Search ................................ 310/114

(56) References Cited

U.S. PATENT DOCUMENTS

| | | | |
|---|---|---|---|
| 5,668,424 A | 9/1997 | Lamb | 310/103 |
| 5,834,872 A | 11/1998 | Lamb | 310/103 |
| 5,880,548 A * | 3/1999 | Lamb | 310/103 |
| 6,005,317 A | 12/1999 | Lamb | 310/103 |
| 6,043,578 A | 3/2000 | Lamb | 310/92 |
| 6,242,832 B1 * | 6/2001 | Lamb | 310/114 |

* cited by examiner

*Primary Examiner*—Nestor Ramirez
*Assistant Examiner*—Iraj A Mohandesi
(74) *Attorney, Agent, or Firm*—Seed IP Law Group PLLC (57) ABSTRACT

In a magnetic coupler, a pair of magnet rotors is slidably mounted on rods. Ferrous material on the conductor rotors attracts the permanent magnets in the magnet rotors. Under static or relative static conditions, the attractive force urges the magnet rotors toward the conductor rotors to create a minimum, operational air gap therebetween. When there is a significant relative rotational velocity between the magnet rotors and the conductor rotors, a repulsion force urges the rotors apart. During start-up, latch arms retain the magnet rotors apart from the conductor rotors by a larger, soft-start air gap. During operation, centrifugal force moves the latch arms out of their active position. If the rotational speed of the load shaft decreases rapidly during operation, the magnet rotors move apart from the conductor rotors by a still larger, fully disengaged air gap.

19 Claims, 11 Drawing Sheets

SELF-UNLOADING MAGNETIC COUPLER

TECHNICAL FIELD

The present invention relates to permanent magnetic couplers of the type having a permanent magnet rotor assembly on one shaft spaced by air gaps from a conductor rotor assembly on another shaft.

BACKGROUND OF THE INVENTION

An adjustable, permanent magnetic coupler is known in which a pair of conductor rotors straddles a pair of magnet rotors. The conductor rotors are connected together to rotate as a unit on one shaft, while the magnet rotors are mounted to rotate with a second shaft and to be axially movable relative to the second shaft. Each magnet rotor has a set of permanent magnets spaced by an air gap from a ferrous-backed electroconductive ring mounted on a respective one of the conductor rotors. Rotation of one of the two shafts results in rotation of the other shaft by way of magnetic forces acting between the magnet rotors and the conductor rotors, without any direct mechanical connection between the shafts.

By moving the magnet rotors axially with respect to the second shaft, the air gap between the magnet rotors and the conductor rotors can be changed. Increasing the air gap reduces the torque coupling the magnet rotors and the conductor rotors. Knowing the relationship between the air gap and the resultant torque, engineers can design an adjustable magnet coupler that converts a particular incoming rotational speed and/or torque to a desired output speed and/or torque by creating the appropriate gap. Actuators have been designed to controllably move the magnet rotors with respect to the conductor rotors to adjust the air gaps in adjustable magnetic couplers.

Under certain operating conditions, such as during startup or upon substantial slowing of the load shaft, the relative rotational speeds of the magnet rotors and the conductor rotors can differ substantially. It has been reported that, under high slip conditions, a repulsion force is generated between the magnet rotors and the conductor rotors. The repulsion force is a function of relative movement slip and, thus, reduces as the rotors approach the same rotational velocity. Under relative static conditions, there is no repulsion force.

SUMMARY OF THE INVENTION

The present invention is directed toward a magnetic coupler configured to allow limited disengagement during startup, but to allow significant disengagement upon emergency stoppage. In one embodiment of the invention, a pair of magnet rotors is slidably mounted on torque rods extending between two end plates. Ferrous material on the conductor rotors is magnetically attracted to the permanent magnets in the magnet rotors. Under static or relative static conditions, the attractive force urges the magnet rotors toward the conductor rotors. Stops retain the magnet rotors apart from the conductor rotors by a minimum air gap selected for desired operating conditions. In certain embodiments, the stops are adjustable to change the minimum air gap.

During startup or emergency stoppage, however, relative rotational velocity between the magnet rotors and the conductor rotors causes an increase in the repulsion force between the magnet rotors and the conductor rotors. The attractive magnetic force is designed to be small enough to be overcome by the repulsion force during start up and emergency stoppage conditions. As a result, under such conditions the repulsion force moves the magnet rotors apart from the conductor rotors. During startup, the magnet rotors collapse against a latch arm positioned therebetween, increasing the air gap between the magnet rotors and the conductor rotors from the minimum air gap to a "soft-start" air gap. The soft-start air gap allows the load to come up to operating speed at a reduced torque level, reducing the impact on the equipment associated with startup. The size of the latch arm or other structures therebetween can be changed to adjust the soft-start air gap.

When the shaft on the load side approaches the rotational speed of the shaft connected to the motor, the repulsion force decreases to a point where it is again overcome by the attractive magnetic force between the magnet rotors and the conductor rotors. Under these conditions, the magnet rotors move back into the operational configuration, spaced by the minimum air gap from the conductor rotors.

At a pre-selected rotational velocity, centrifugal force moves the latch arms from the soft-start configuration to a "running speed" or fully disengaged configuration. While the latches are in the running speed configuration, should the load shaft rapidly decelerate, the differential rotational velocities between the magnet rotors and the conductor rotors will result in the above-discussed repulsion force. Because the latch is now in the running speed configuration, however, the magnet rotors are able to collapse beyond the soft-start air gap. The magnet rotors instead collapse further, creating a maximum air gap between the magnet rotors and the conductor rotors that can substantially reduce the rotational torque forces therebetween. This fully disengaged configuration can allow the motor to continue running indefinitely while the load has substantially slowed or ceased, and can thus prevent damage to the equipment.

Ultimately, when the motor and the load have both stopped, the repulsive force again diminishes, allowing the attractive magnetic force to draw the magnet rotors back out to the initial, static configuration.

As discussed in more detail below, the present invention is directed toward a number of structures that allow the magnetic coupler to freely move between the above discussed configurations and, as such, to allow the system to automatically assume distinct configurations for startup, standard operating conditions, emergency stoppage, and static conditions. The present invention is also directed toward methods of performing the same.

DETAILED DESCRIPTION OF THE ILLUSTRATED EMBODIMENTS

The present invention is generally directed toward magnetic couplers in which a pair of conductor rotors are fixedly attached to a first shaft and a pair of magnet rotors are positioned between the two conductor rotors and are axially, slidably coupled to a second shaft. The magnet rotors are freely slidable over a limited distance, and are configured to remain in a number of pre-selected configurations during static conditions, startup conditions, operating conditions, or emergency conditions. Many specific details of certain embodiments of the invention are set forth in the following description and in FIGS. 1 to 11 to provide a thorough understanding of such embodiments. One skilled in the art, however, will understand that the present invention may have additional embodiments, or may be practiced without several of the details described in the following description.

Figure 1:
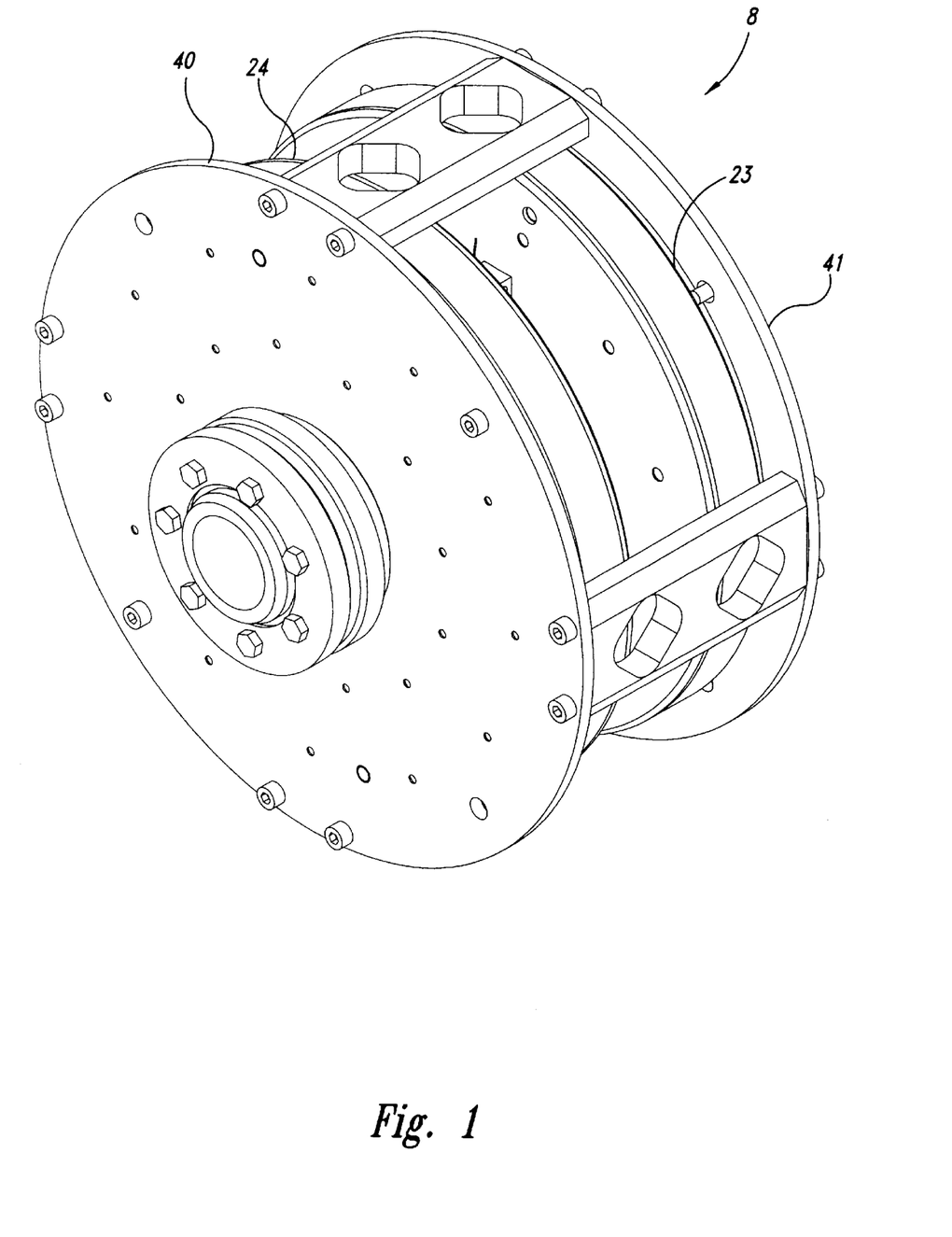
FIG. 1 is an isometric view of a magnetic coupler according to one embodiment of the present invention.
Figure 2:
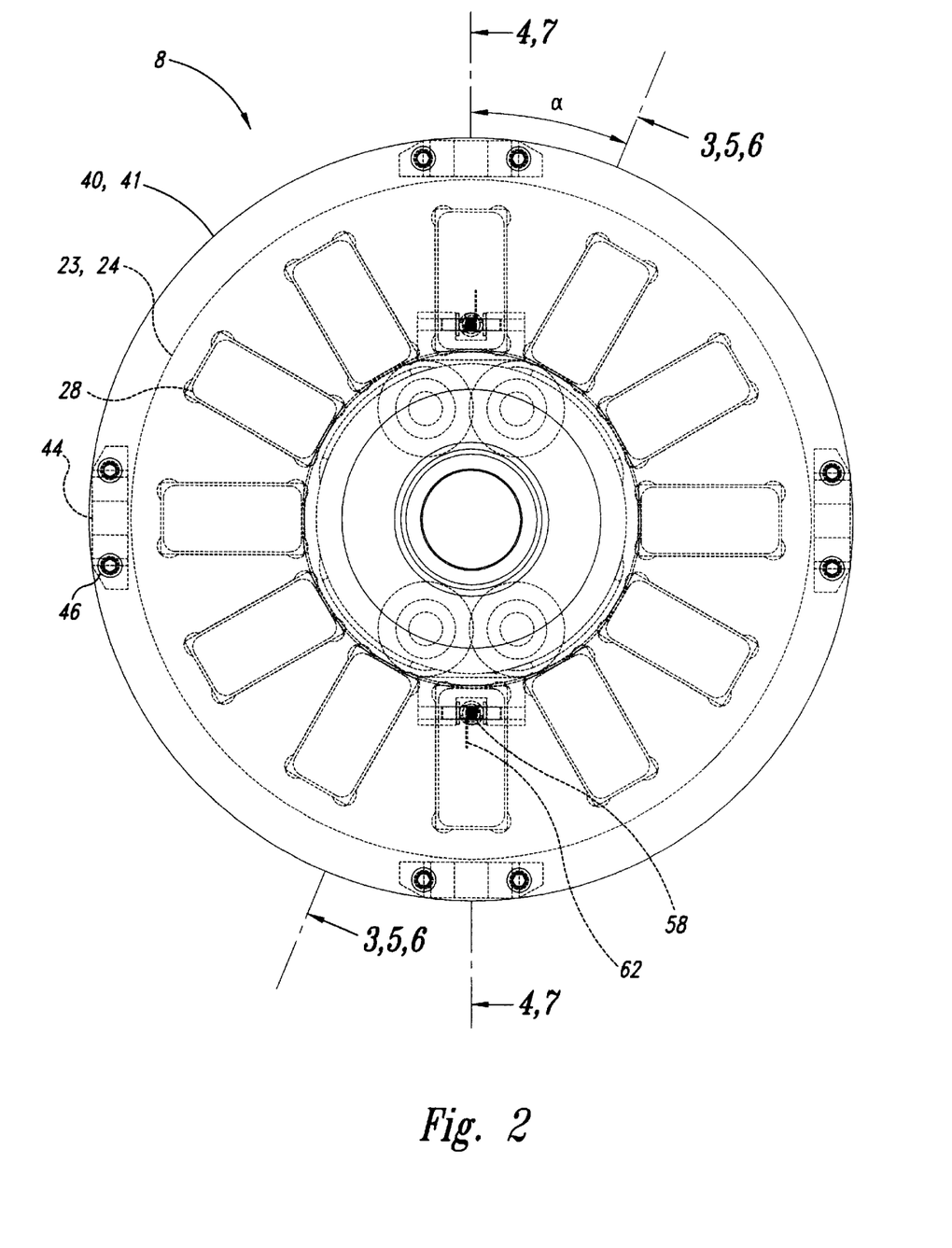
FIG. 2 is an end view, along the axis of rotation, of the magnetic coupler of FIG. 1.

FIGS. 1 and 2 generally illustrate a magnetic coupler 8 according to one particular embodiment of the present invention. The illustrated magnetic coupler 8 generally comprises a pair of magnet rotors 23, 24 positioned between a pair of conductor rotors 48.

Figure 3:
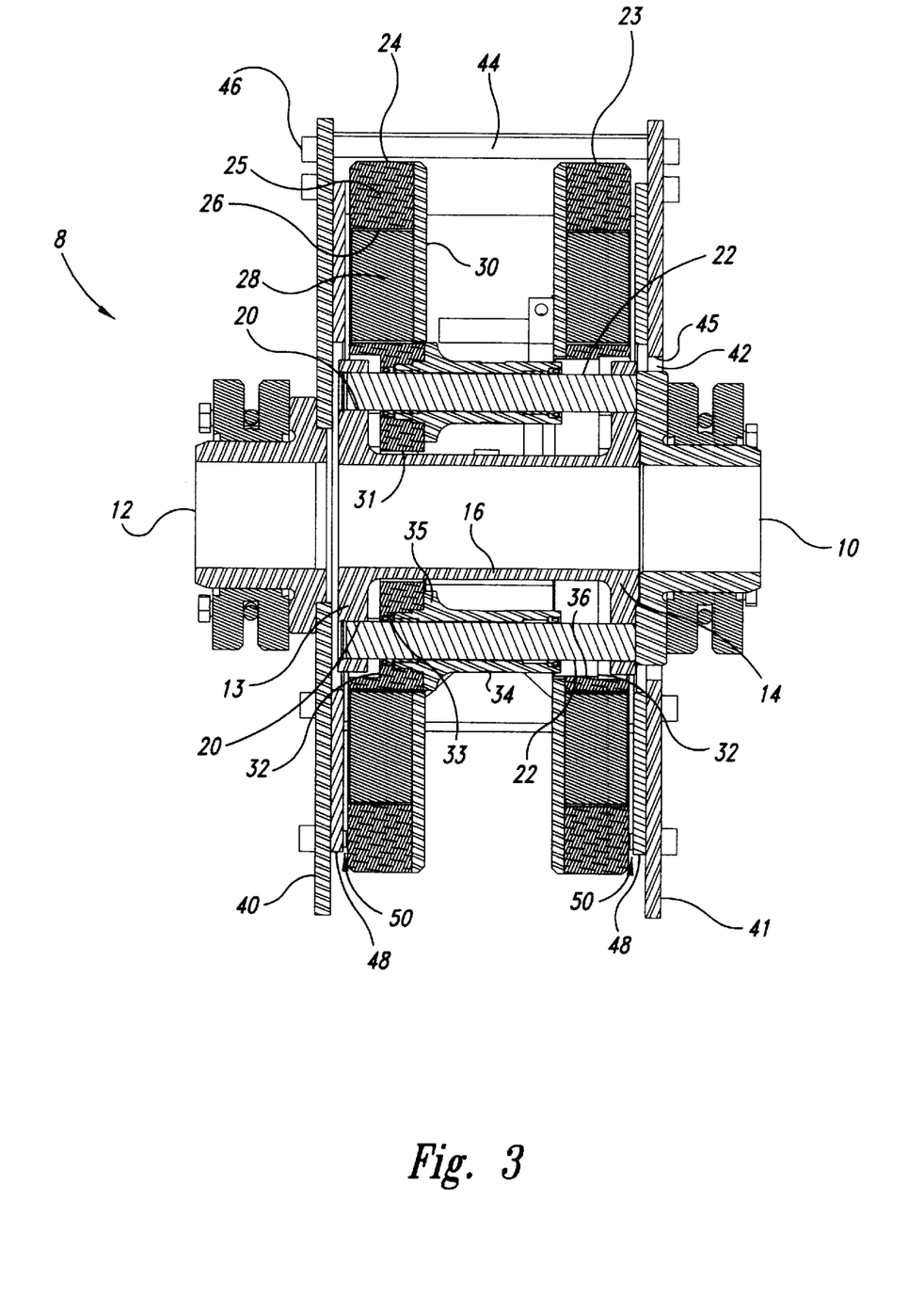
FIG. 3 is a diametric sectional view of the magnetic coupler of FIG. 2, viewed along Section 3—3, in a static configuration.

As illustrated in FIG. 3, a first hub 10 is connected to a magnet rotor assembly and a second hub 12 is connected to a conductor rotor assembly. The magnet rotor assembly includes two substantially circular end plates 13, 14 which are axially spaced apart by a spool 16 which can be welded or otherwise rigidly connected to the end plates. The end plates 13, 14 are each provided with four holes 20 interfitting with a respective end of four parallel torque rods 22. A pair of magnet rotors 23, 24 are slide mounted on the torque rods 22.

Each of the magnet rotors 23, 24 has a primary rotor 25 having a circular array of rectangular pockets 26 formed therein for collectively receiving a set of magnets 28 that can be arranged so that adjacent magnets have their poles reversed. Each of the magnet sets can be backed by a ring 30 of a ferrous material that is screwed to the respective primary rotor 25. The primary rotors 25 have a central opening 31 providing a clearance with the spool 16 and have circular recesses 32 in their outer faces. A first pair of holes 33 extends from the recess 32 in each primary rotor 25 to the opposite face thereof to receive a "bushing support column" 34 having a flange or collar 35 seated against the primary rotor and held thereto, such as by socket head cap screws. The two bushing support columns 34 on one magnet rotor 23 are rotated with respect to the corresponding pair on the other magnet rotor 24 by an offset angle α (see FIG. 2) so that, collectively, the four bushing support columns are sleeved on the four torque rods 22. A second pair of holes 36 is aligned with the bushing support columns 34 mounted on the other magnet rotor, each of which is sized to allow the bushing to pass therethrough.

Continuing to the conductor rotor assembly, it is seen that it has one end ring 40 mounted on the hub 12 and a second end ring 41 with an inner diameter 45 spaced by a gap 42 from the hub 10 and end plate 14. The end rings 40, 41 are separated from each other by spacers 44 secured in place by bolts 46. Mounted on the inward facing sides of the end rings 40, 41 is a pair of conductor rings 48 spaced by minimum air gaps 50 from the magnet rotors 23, 24. In the illustrated embodiment, the conductor rings 48 are copper and the end rings 40, 41 are mild steel. The inventor appreciates that other materials can be substituted therefor.

Figure 4:
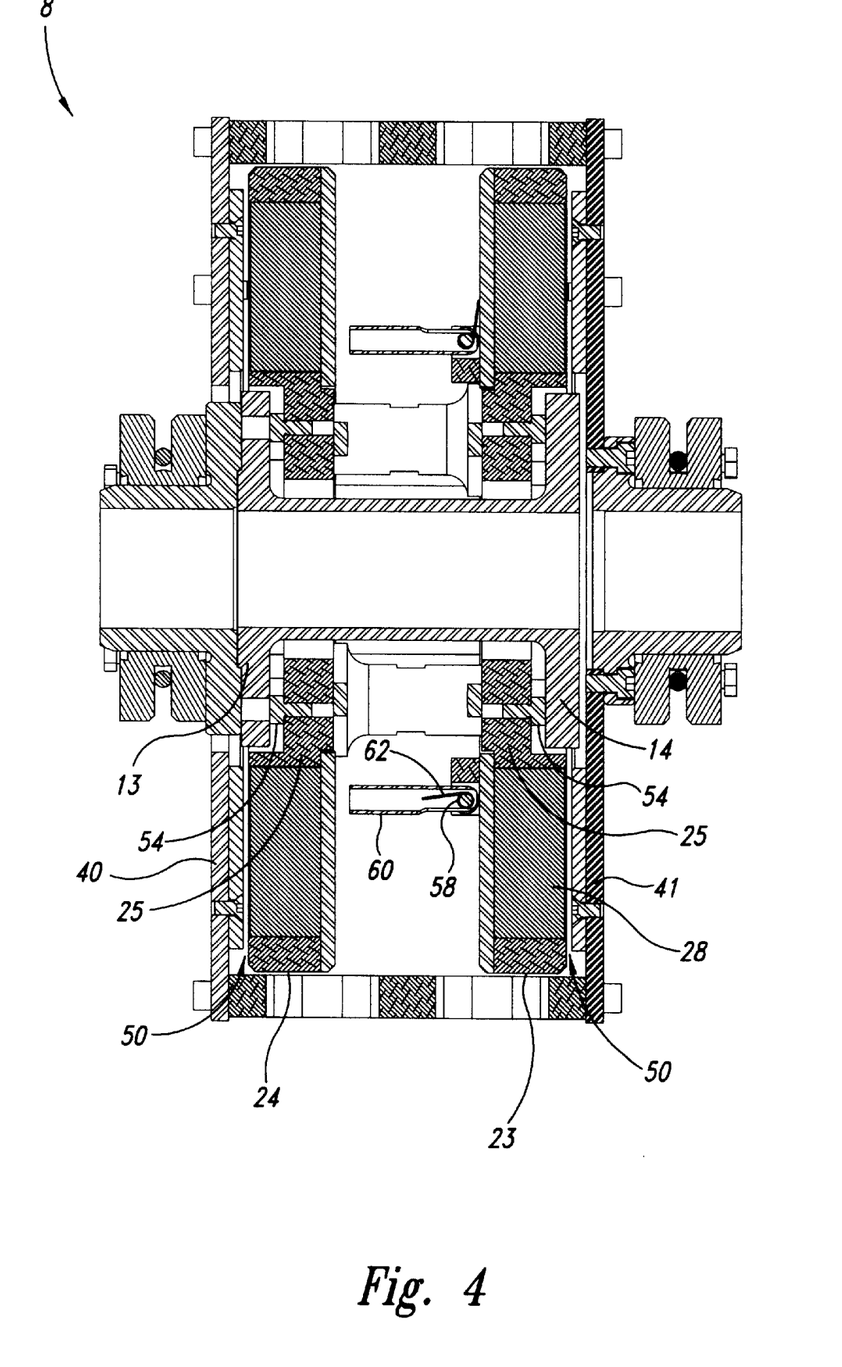
FIG. 4 is a diametric sectional view of the magnetic coupler of FIG. 2, viewed along Section 4—4, in the static configuration.

As illustrated in FIG. 4, when the magnet rotors 23, 24 and the conductor rotors 48 are in a static condition, the magnet rotors are spaced from the conductor rotors by the minimum air gap 50. This minimum air gap 50 is selected by adjusting a number of bumpers or setscrews 54 that pass through threaded holes in the primary rotors 25 and contact the end plates 13, 14. The heads of the setscrews can be made accessible from outside the magnetic coupler 8. Certain embodiments do not incorporate set screws or bumpers.

Figure 6:
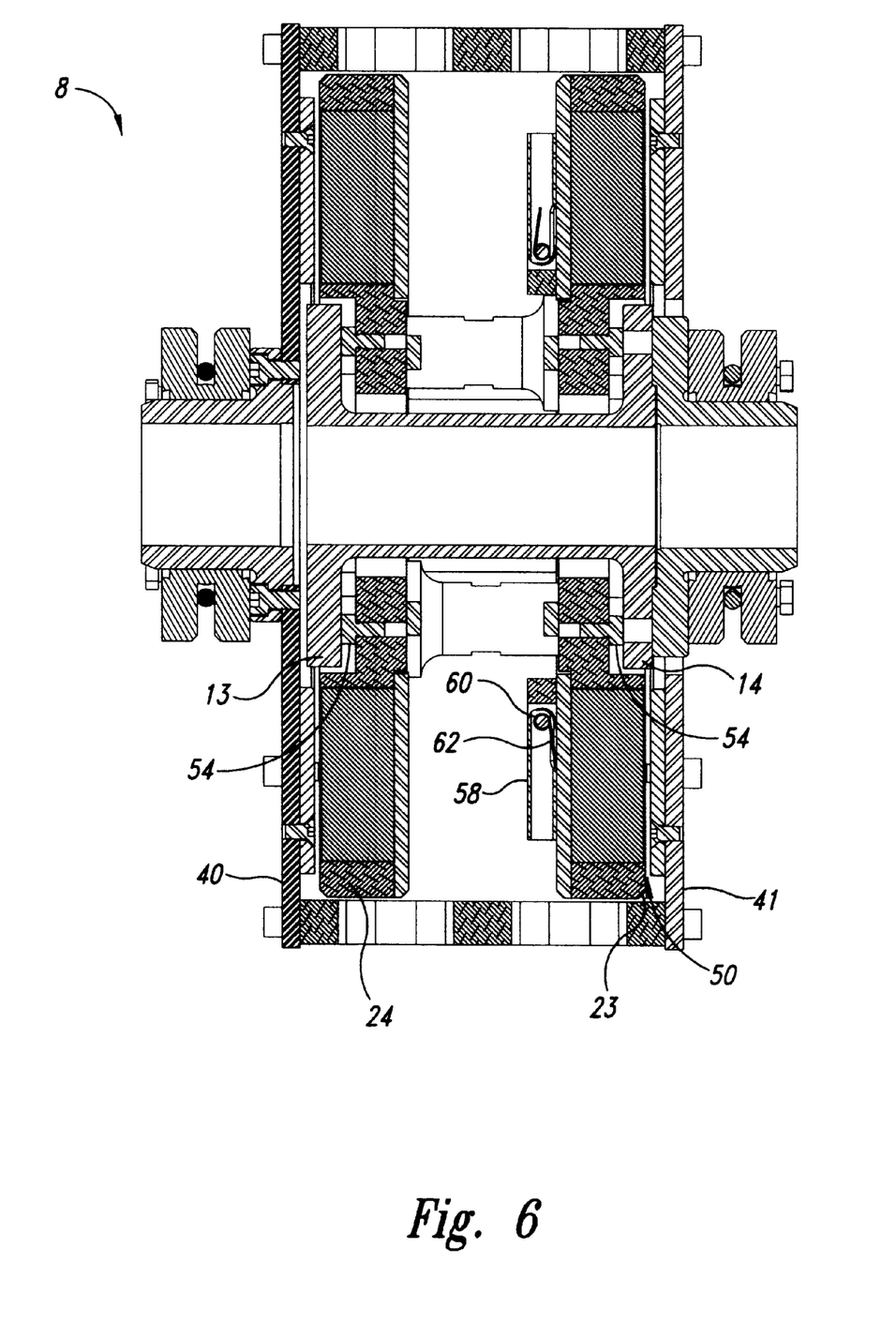
FIG. 6 is a diametric sectional view of the magnetic coupler of FIG. 2, viewed along Section 6—6, in the operational configuration.

The magnet rotors 23, 24 have latch arms 58 mounted thereon which are swing-mounted on pins 60 to swing between an active position extending toward the opposing magnet rotor (as illustrated in FIG. 4) and an inactive position extending radially with respect to the magnet rotors (as illustrated in FIG. 6). The latch arms 58 are urged into the active position by springs 62 and into the inactive position by centrifugal force responsive to rotation of the magnet rotors 23, 24.

The magnetic coupler 8 illustrated in FIG. 4 is in the static configuration: neither the magnet rotors 23, 24 nor the conductor rotors 48 are rotating. Under such conditions, there is no centrifugal force acting on the latch arms 58. Accordingly, the springs 62 urge the latch arms 58 into the active position. The magnet rotors 23, 24, however, do not contact the latch arms 58. This is because the magnetic attraction between the permanent magnets 28 and the ferrous material in the end rings 40, 41 attract each other, drawing the magnet rotors 23, 24 apart from each other. The setscrews 54 contact the end plates 13, 14, retaining the magnet rotors 23, 24 apart from the conductor rotors 48 by the minimal air gap 50.

Figure 5:
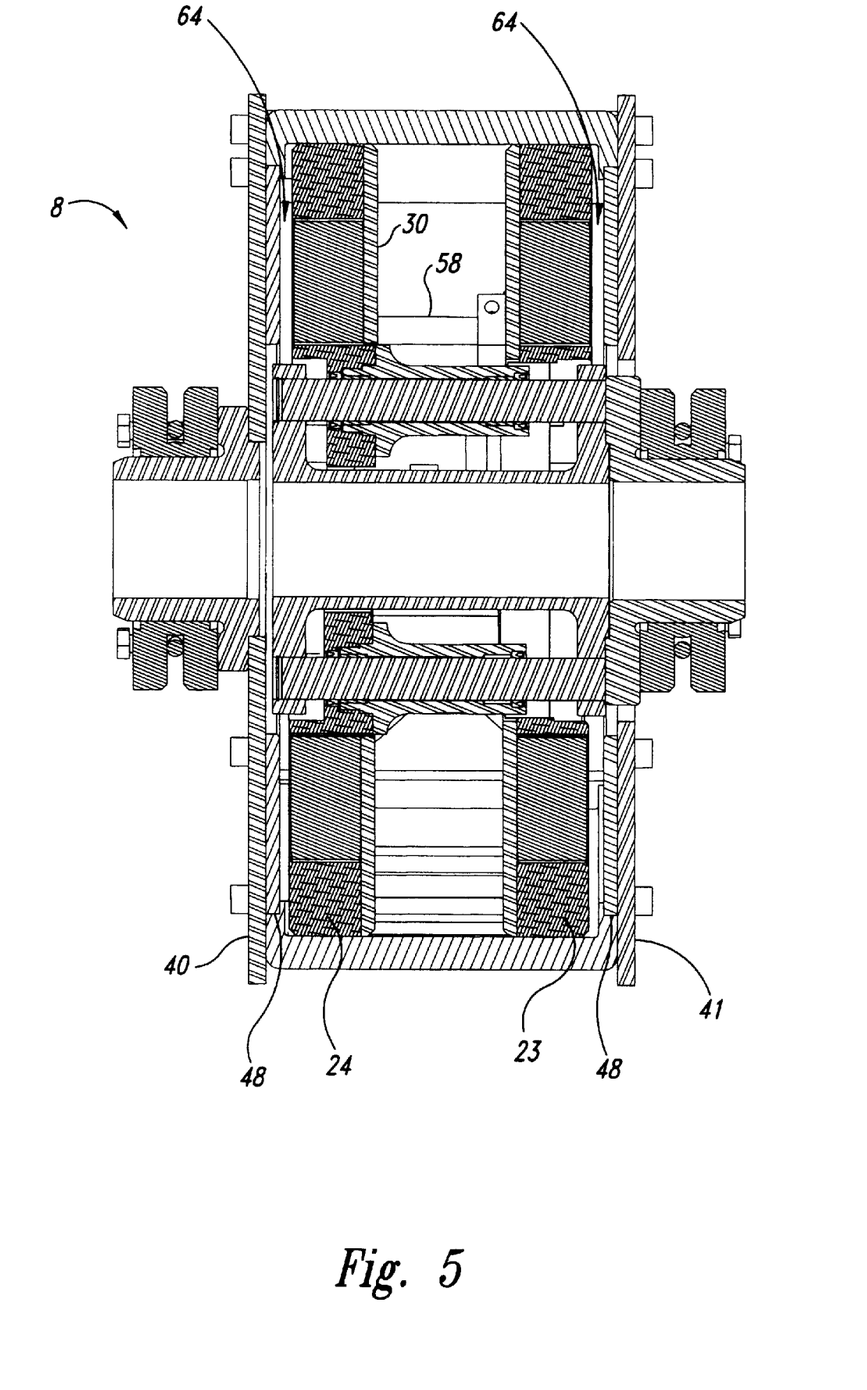
FIG. 5 is a diametric sectional view of the magnetic coupler of FIG. 2, viewed along Section 5—5, in the soft-start configuration.

FIG. 5 illustrates the magnet rotor 8 during startup conditions. In the illustrated embodiment, under startup conditions, the conductor rotors 48 are connected to a running motor and are rotating rapidly, while the magnet rotors 23, 24 are attached to a load and are just beginning to gain rotational velocity. Accordingly, the relative rotational velocity between the magnet rotors 23, 24 and the conductor rotors 48 is substantial, creating a large repulsion force between the magnet rotors and the conductor rotors. As a result of this repulsion force, the magnet rotors 23, 24 move toward each other until the backing plate 30 on one magnet rotor contacts the latch arm 58 projecting from the other magnet rotor. The space between the magnet rotors and the conductor rotors in this configuration is increased with respect to the minimum gap 50 to a startup (soft-start) gap 64. As the soft-start gap 64 is larger than the minimum gap 50 (the minimum gap, as discussed below, is also the gap at full operational speed), the rotational torque force exerted on the load is slightly reduced as compared to operational conditions. As a result, the load can be accelerated up to speed, but the impact and other shock on the load are reduced, which may reduce damage to the motor, the load and its equipment.

FIG. 6 illustrates the magnetic coupler 8 during operational conditions. In this configuration, both the magnet rotors 23, 24 and the conductor rotors 48 are rotating at full operating speed. As a result, centrifugal force has moved the latch arms 58 from the active position to the inactive position. Nonetheless, because the relative rotational speed between the magnet rotors 23, 24 and the conductor rotors 48 is minimal, there is little or no repulsion force between the two. Therefore, the magnetic attraction discussed above with respect to static conditions likewise causes the magnet rotors 23, 24 to move toward the conductor rotors 48 until the setscrews 54 contact the end plates 13, 14. The magnet rotors 23, 24 are now spaced apart from the conductor rotors 48 by the minimum air gap 50, which could also be called the operational air gap. Because the minimal air gap 50 is smaller than the air gaps in the startup configuration, the magnet coupler 8 can operate at a higher torque, and higher efficiency in this configuration.

Figure 7:
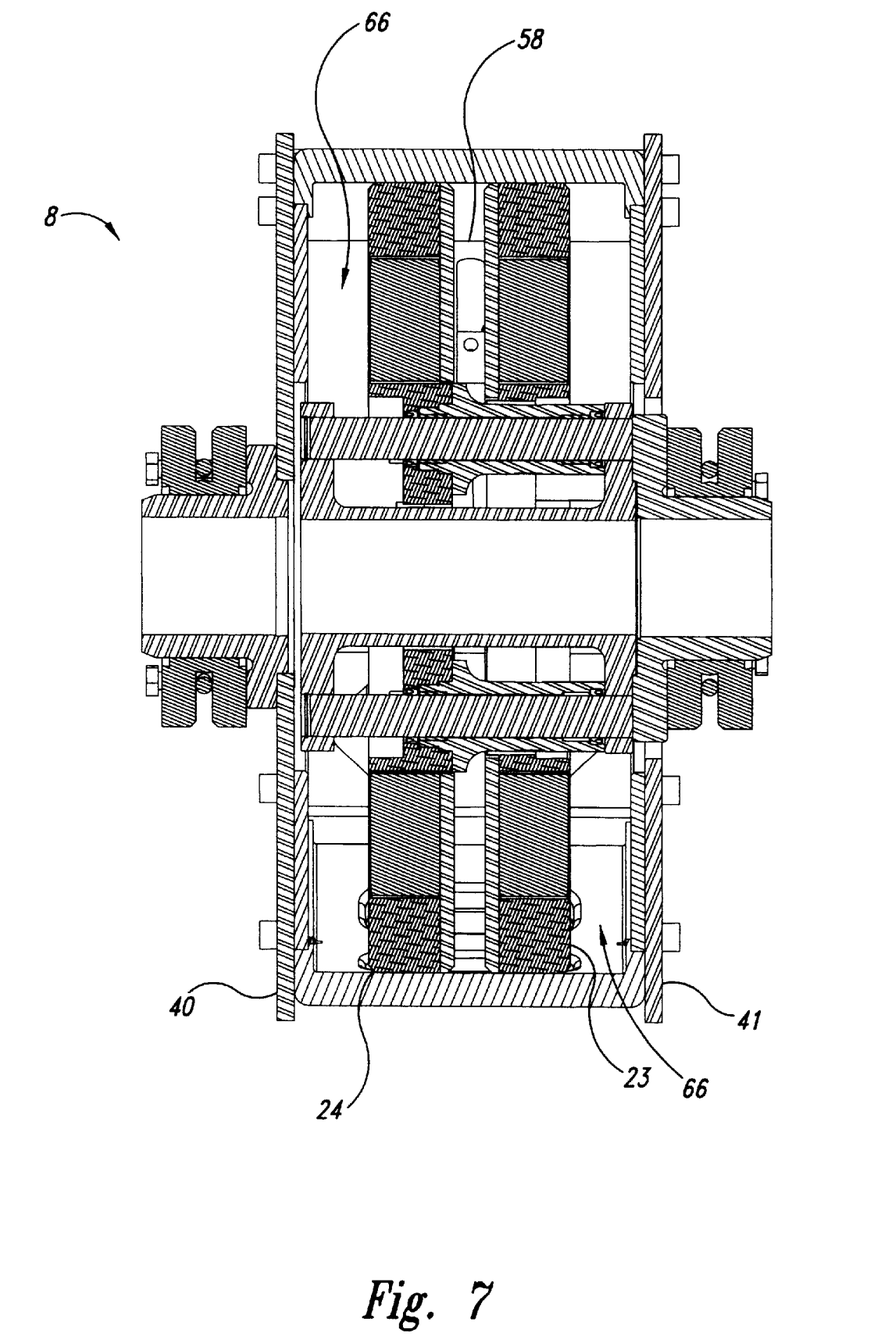
FIG. 7 is a diametric sectional view of the magnetic coupler of FIG. 2, viewed along Section 7—7, in the fully disengaged configuration.

FIG. 7 illustrates the magnetic coupler 8 in a maximum disengagement configuration. This configuration may be caused when the load is subjected to an unexpected reduction in rotational velocity, such as during an output shaft stoppage. When the load shaft rapidly reduces rotational velocity, the relative velocity between the magnet rotors 23, 24 and the conductor rotors 48 is sufficiently great to create a repulsion force similar to that discussed above in connection with the startup configuration. In this instance, however, the latch arms 58 are in the inactive position due to the rotational speed of the magnet rotors 23, 24. When the repulsion force overcomes the magnetic attraction between the magnet rotors 23, 24 and the end rings 40, 41, the latch arms 58 do not limit the movement of the magnet rotors as they did in the startup configuration. Instead, the magnet rotors 23, 24 collapse further, to a point where the air gap between the magnet rotors and the conductor rotors 48 is a maximum air gap 66. This maximum air gap 66 substantially reduces or eliminates the rotational forces between the magnet rotors 23,24 and the conductor rotors 48, reducing or eliminating the torque on the load. As a result, damage to the equipment may be reduced or eliminated.

Figure 8:
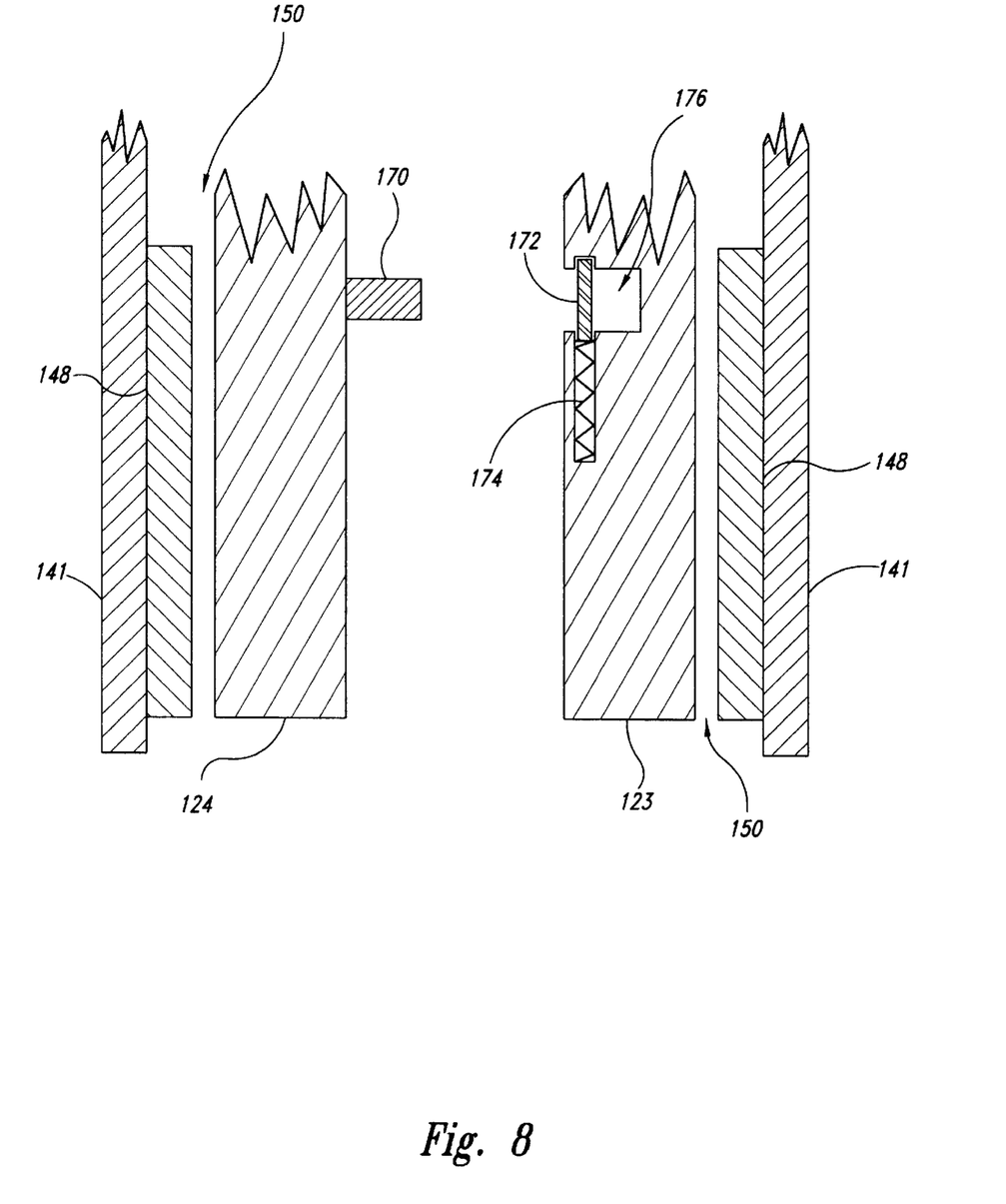
FIG. 8 is a sectional view of a portion of a magnetic coupler according to another embodiment of the present invention, shown in a static configuration.

FIGS. 8–11 illustrate another embodiment of the present invention. FIG. 8 illustrates a pair of magnet rotors 123, 124 in a static configuration. In this configuration, neither the magnet rotor 123, 124 nor the conductor rotors 148 are rotating. Consequently, the magnet rotors 123, 124 are attracted to backing material 140, 141 connected to the conductor rotors 148, and move toward the conductor rotors to create a minimum air gap 150.

In the illustrated embodiment, one of the magnet rotors 124 has mounted thereon an arm 170 that projects away from the magnet rotor. On the opposing magnet rotor 123, aligned with the arm 170, is an opening 176. In the static configuration, a shutter 172 is positioned over the opening 176. A spring 174 retains the shutter 172 in the closed position.

Figure 9:
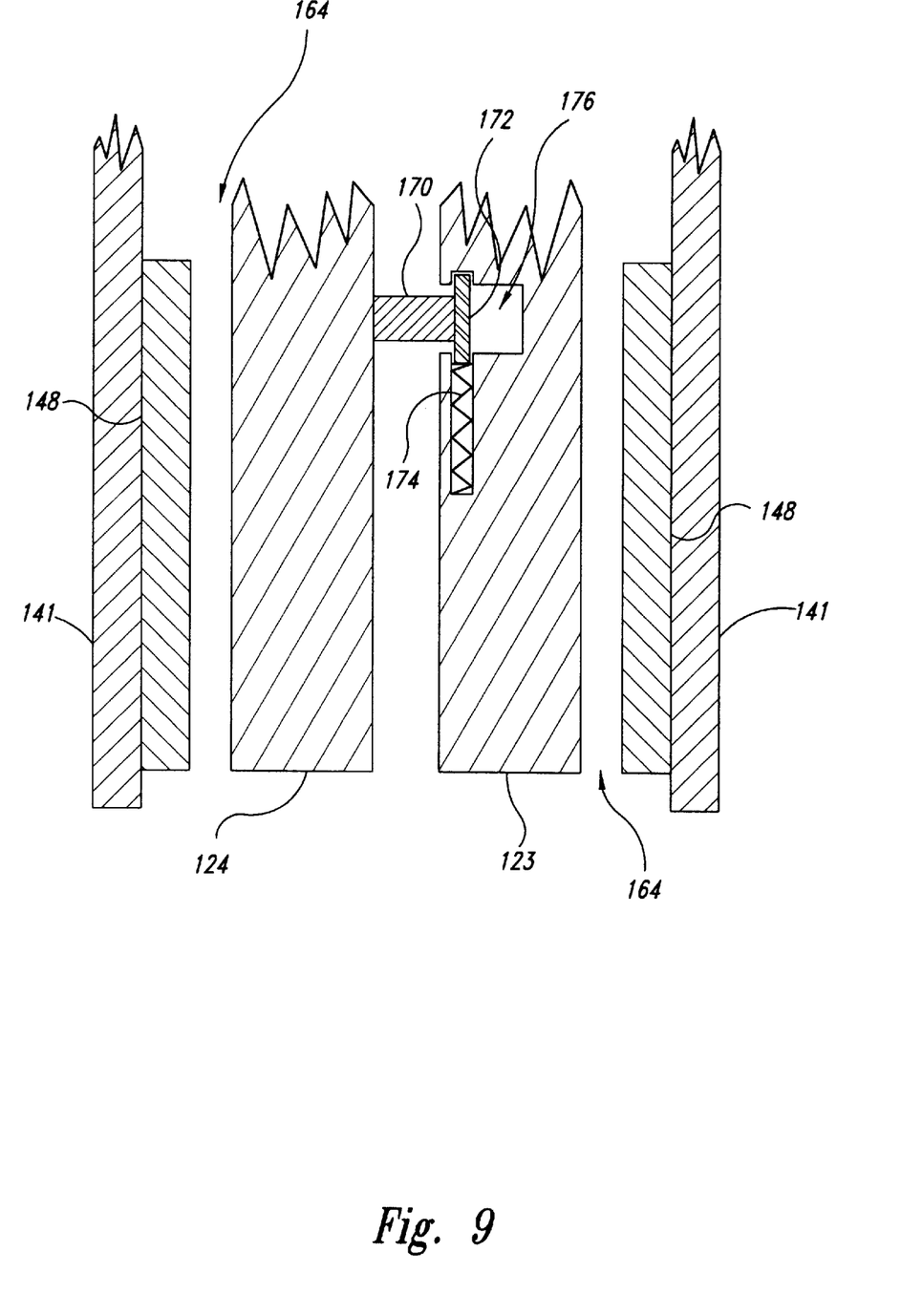
FIG. 9 is a sectional view of the portion of the magnetic coupler of FIG. 8, shown in a soft-start configuration.

FIG. 9 illustrates the magnet rotors 123, 124 in a startup configuration. As discussed above in connection with the prior embodiment, repulsion forces during startup urge the magnet rotors 123, 124 toward each other. In the illustrated embodiment, the shutter 172 prevents the arm 170 from entering the opening 176. The length of the arm 170 and the position of the shutter 172 are selected to retain the magnet rotors 123, 124 in a position that creates a desired soft-start air gap 164.

Figure 10:
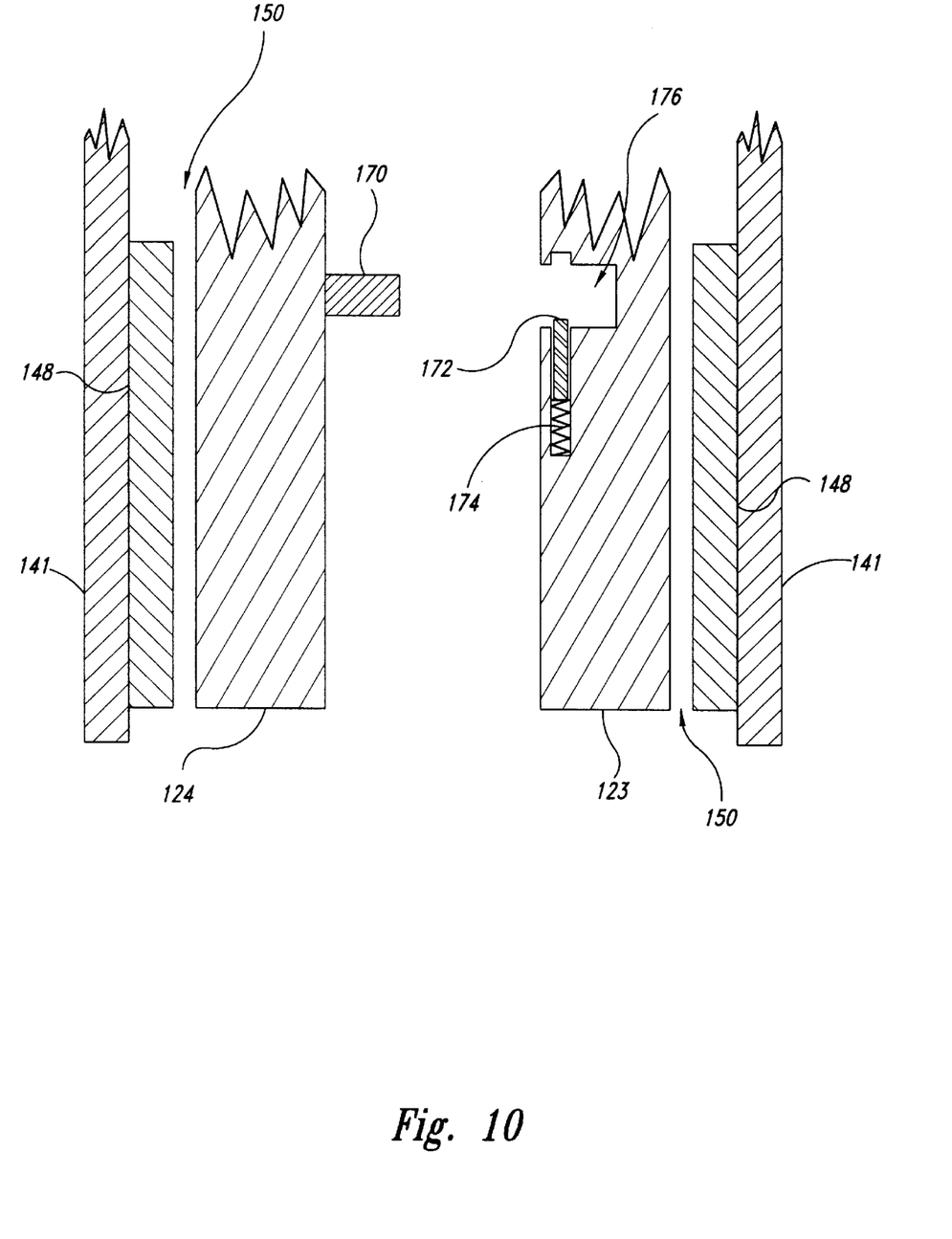
FIG. 10 is a sectional view of the portion of the magnetic coupler of FIG. 8, shown in an operational configuration.

FIG. 10 illustrates the magnet rotors 123, 124 in an operating configuration. As the magnet rotors 123, 124 and the conductor rotors 148 are moving at or close to the same speed, the magnet rotors move outward to create the operational, or minimum, air gap 150. Also, while the magnet rotors are rotating at operating speeds, the shutter 172 moves outward to compress the spring 174 under centrifugal force. As a result, the opening 176 is now unobstructed.

Figure 11:
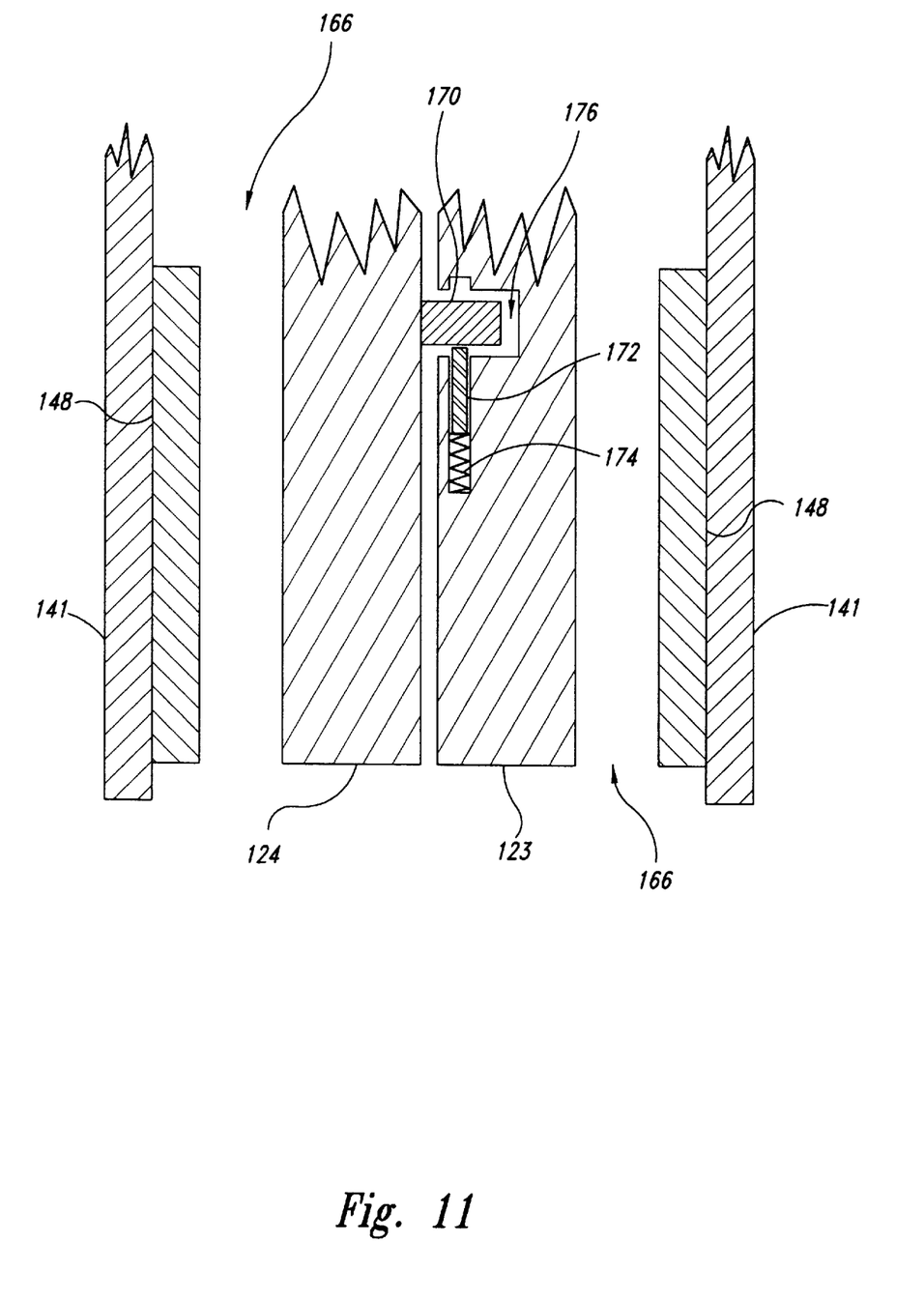
FIG. 11 is a sectional view of the portion of the magnetic coupler of FIG. 8, shown in a pop-off configuration.

FIG. 11 illustrates a fully disengaged configuration, such as when the magnet rotors 123, 124 have collapsed against each other in response to a drastic reduction of speed by the load shaft. Because, at the time of the reduction in speed, the shutter 172 was in the open position, the arm 170 enters the opening 176. The magnet rotors 123, 124 can therefore collapse to a configuration that creates a pop-off air gap 166 between the magnet rotors and the conductor rotors 148.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A coupler, comprising:

first and second rotary hubs, each having a rotary axis;

two coaxial magnet rotors each containing a respective set of permanent magnets;

two coaxial conductor rotors each having a non-ferrous electroconductive ring spaced by a gap from a respective one of the sets of magnets;

a first two of the rotors being spaced apart a fixed axial distance and being mounted as a unit on the first hub to rotate in unison therewith;

two end plates connected by rods and being mounted to rotate in unison with the second hub, the remaining two of the rotors being moveable axially on the rods with respect to the first two of the rotors, the rotors being configured to move into three distinct configurations, a first position with a minimum air gap, an intermediate position with an intermediate air gap greater than the minimum air gap, and a second position with a maximum air gap greater than the intermediate air gap; and magnet attracting material associated with the conductor rotors, the magnet attracting material being sized and shaped to interact with respective of the sets of permanent magnets and to magnetically bias the rotors into the first position, wherein overloading of the coupler caused by sufficient slip between the magnet and conductor rotors results in an axial thrust opposing and exceeding the bias to move the magnet and conductor rotors out of the first position.

2. The coupler of claim 1, further comprising adjustable stops positioned between the end plates and the remaining two of the rotors for adjusting the gap.

3. A coupler according to claim 1 in which both of the rotors in the unit are conductor rotors; and the remaining rotors are magnet rotors located between the conductor rotors.

4. A coupler according to claim 1 in which the stops comprise set screws passing through the end plates and arranged to contact the remaining two of the rotors.

5. A coupler, comprising:

first and second rotary shafts, each having a rotary axis;

two coaxial magnet rotors each containing a respective set of permanent magnets;

two coaxial conductor rotors each having a non-ferrous electroconductive ring spaced by a gap from a respective one of the sets of magnets;

a first two of the rotors being spaced apart a fixed axial distance and being mounted as a unit on the first shaft to rotate in unison therewith;

the remaining two of the rotors being mounted to rotate in unison with the second shaft and to be moveable axially in opposite directions with respect to the second shaft into and out of a magnetically coupled relationship with the first two of the rotors;

magnet attracting material associated with the conductor rotors such as to interact with respective of the sets of permanent magnets and magnetically bias the rotors into the coupled relationship, wherein relative rotation between the magnet and conductor rotors in the form of slip results in an axial force counter to the bias urging the rotors out of the coupled relationship; and latch elements carried by the remaining rotors and arranged when in an active position to limit axial movement of the remaining rotors due to repelling forces during startup of the coupler, the latch elements being moveable responsive to centrifugal force to an inactive position whereby the coupler is able to fully disengage due to repelling forces following startup.

6. A coupler according to claim 5 in which there is a stop associated with the rotors limiting the minimum size of the gap.

7. A coupler according to claim 6 in which the minimum air gap is adjustable by adjustment of the stop so as to be such that after startup a slip between the shafts from an overload condition causes axial thrust exceeding the bias, thereby disengaging the coupler.

8. A coupler according to claim 5 in which each of the latch elements is arranged to swing on a swing axis from an active position parallel to the rotary axis to an inactive position directed radially outward from the rotary axis.

9. A coupler according to claim 8 in which each latch element has a spring arranged to yieldingly resist swinging thereof away from its active position at low rotational speeds.

10. A magnetic coupler for preventing pop-off during startup and allowing pop-off after startup, comprising:

first and second rotary shafts, each having a rotary axis;

two coaxial magnet rotors, each having a set of permanent magnets;

two coaxial conductor rotors positioned adjacent the respective magnet rotors, each conductor rotor having a non-ferrous, electroconductive ring spaced by a first gap from the respective magnet rotor;

a first two of the rotors being spaced apart from each other by a fixed axial distance and being mounted as a unit on the first shaft to rotate in unison therewith;

the remaining two of the rotors being mounted to rotate in unison with the second shaft and to be moveable axially with respect to the second shaft in relationship with the first two of the rotors;

magnet attracting material coupled to each of the conductor rotors to magnetically bias the magnet rotors toward the conductor rotors, the magnet attracting material being sized, shaped and positioned such that a repulsive force caused by significant relative rotation between the magnet rotors and the conductor rotors is sufficient to counter the bias and urge the remaining two rotors apart from the first two rotors; and at least one latch element carried by the second shaft, the at least one latch element being movable under centrifugal force between an active position in which the at least one latch element limits movement of the remaining two of the rotors to a first distance apart from the first two rotors, and an inactive position in which the at least one latch element limits movement of the remaining two of the rotors to a second distance apart from the first two rotors, the second distance being greater than the first distance.

11. The magnetic coupler of claim 10 wherein the first distance is predetermined to provide the coupler with soft-start characteristics.

12. The magnetic coupler of claim 10 wherein the second distance is predetermined to provide the coupler with indefinite running characteristics.

13. The magnetic coupler of claim 10 wherein the magnet attracting material is in the form of a ferrous material distributed about the perimeter of the conductor rotors.

14. The magnetic coupler of claim 10 wherein the magnet attracting material is in the form of a ring of ferrous material concentrically positioned about the conductor rotors.

15. The magnetic coupler of claim 10 wherein the magnet attracting material is in the form of a ring of ferrous material concentrically positioned about the conductor rotors, and is located on a face of the conductor rotors opposite the respective magnet rotors.

16. The magnetic coupler of claim 10 wherein the at least one latch element comprises a latch arm pivotal between the active and inactive positions.

17. The magnetic coupler of claim 10 wherein the at least one latch element comprises a fixed arm projecting inwardly from one of the remaining two rotors and a shutter on the other of the remaining two rotors, the shutter being aligned with the fixed arm and being movable between the active position wherein the shutter obstructs passage of the fixed arm, and the inactive position wherein the shutter allows the fixed arm to at least partially enter an opening in the other of the remaining two rotors.

18. The magnet coupler of claim 10 wherein the at least one latch element is adjustable to change the first distance.

19. A magnetic coupler for preventing full disengagement during startup and allowing full disengagement after startup, comprising:

first and second rotary shafts, each having a rotary axis;

a magnet rotor having a set of permanent magnets;

a conductor rotor positioned adjacent the magnet rotors, the conductor rotor having a non-ferrous, electroconductive ring spaced by a first gap from the magnet rotor;

a first of the rotors being mounted on the first shaft to rotate in unison therewith, the first of the rotors being axially fixed with respect to the first shaft;

the remaining of the rotors being mounted to rotate in unison with the second shaft and to be moveable axially with respect to the second shaft into and out of a magnetically coupled relationship with the first of the rotors;

magnet attracting material coupled to the conductor rotor to magnetically bias the magnet rotor toward the conductor rotor and to urge the rotors into a coupled relationship, the magnet attracting material being sized, shaped and positioned such a repulsive force caused by significant relative rotation between the magnet rotor and the conductor rotor is sufficient to counter the bias and urge the rotors out of the coupled relationship; and at least one latch element movable by centrifugal force between an active position in which the at least one latch element limits movement of the remaining of the rotors to a first distance out of the coupled relationship, and an inactive position in which the at least one latch element limits movement of the remaining of the rotors to a second distance out of the coupled relationship, the second distance being greater than the first distance.

* * * * *